United States Patent
Zhang

(10) Patent No.: US 9,983,726 B2
(45) Date of Patent: May 29, 2018

(54) ELECTRONIC DEVICE AND SCRATCH PREVENTION METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yu Zhang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 0 days. days.

(21) Appl. No.: 15/264,609

(22) Filed: Sep. 14, 2016

(65) Prior Publication Data
US 2017/0153745 A1    Jun. 1, 2017

(30) Foreign Application Priority Data
Nov. 27, 2015  (CN) .......................... 2015 1 0855003

(51) Int. Cl.
*G06F 3/041* (2006.01)
*G08B 21/18* (2006.01)

(52) U.S. Cl.
CPC ......... *G06F 3/0416* (2013.01); *G08B 21/182* (2013.01); *G06F 2203/04105* (2013.01)

(58) Field of Classification Search
None
See application file for complete search history.

(56) References Cited

U.S. PATENT DOCUMENTS

| | | | |
|---|---|---|---|
| 2008/0128179 A1* | 6/2008 | Tatehata | G06F 3/0416 178/18.01 |
| 2010/0020035 A1* | 1/2010 | Ryu | G06F 3/04883 345/173 |
| 2010/0283740 A1* | 11/2010 | Chao | G06F 3/0416 345/173 |

* cited by examiner

*Primary Examiner* — Nicholas Lee
(74) *Attorney, Agent, or Firm* — ScienBiziP, P.C.

(57) ABSTRACT

An electronic device with a processing device and a storage device also has a touch panel and a pressure sensing device. A press signal of a touch from the pressure sensing device is detected by the processing device when a simple touch signal on the touch panel is also detected. The processing device compares the press signal to the touch signal to determine whether the press signal includes a first pressure signal detected around a touch area of the touch signal. If the first pressure signal is detected, a warning signal according to the first pressure signal can be issued.

12 Claims, 2 Drawing Sheets

ELECTRONIC DEVICE AND SCRATCH PREVENTION METHOD

CROSS-REFERENCE TO RELATED APPLICATIONS

This application claims priority to Chinese Patent Application No. 201510855003.8 filed on Nov. 27, 2015, the contents of which are incorporated by reference herein.

FIELD

The subject matter herein generally relates to scratch prevention.

BACKGROUND

Touch screens are popular for use as displays and as user input devices on many devices. However, the touch screen may be scratched by a nail when the user provides a fingertip.

BRIEF DESCRIPTION OF THE DRAWINGS

Implementations of the present technology will now be described, by way of example only, with reference to the attached figures.

DETAILED DESCRIPTION

Figure 1:
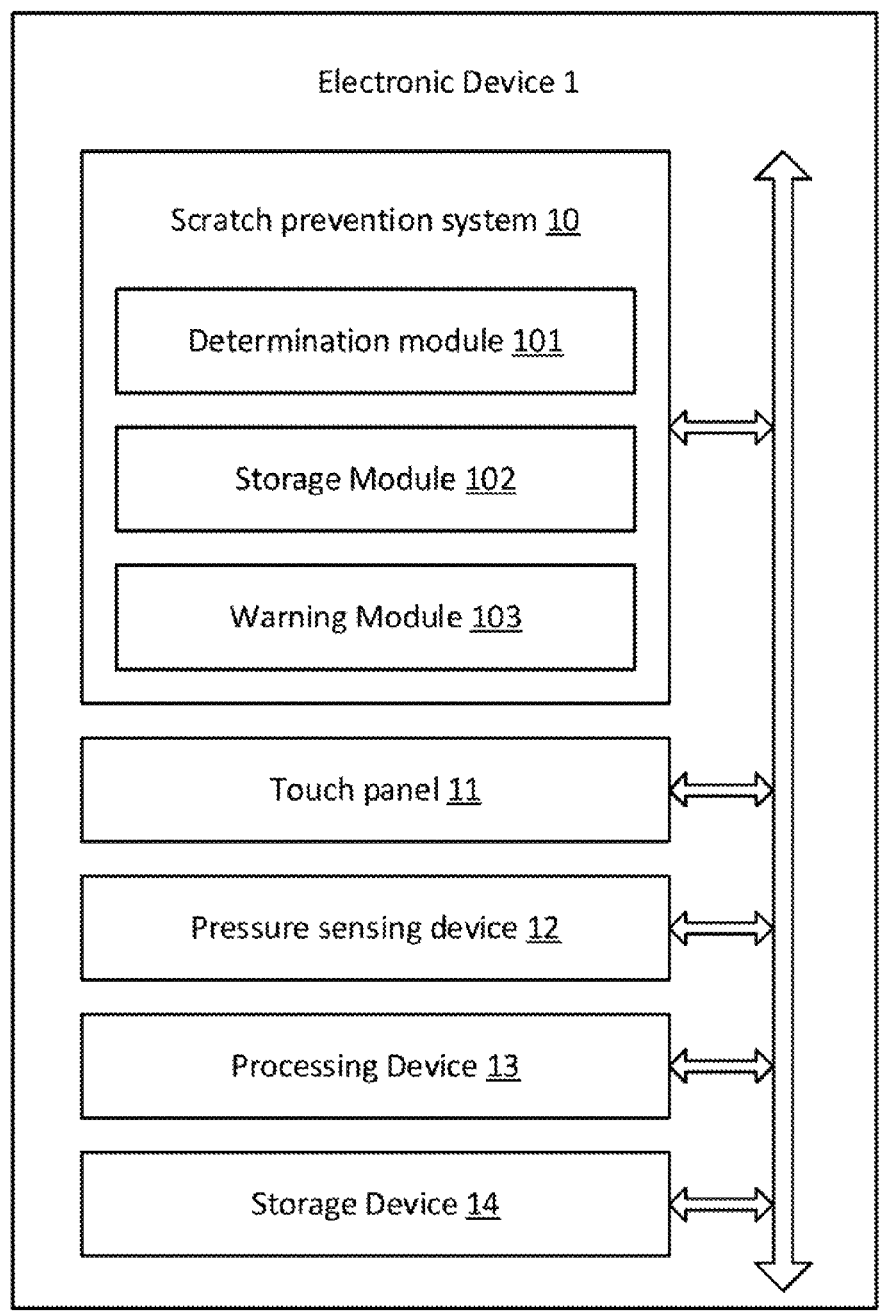
FIG. 1 is a block diagram of one embodiment of an electronic device including a scratch prevention system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts can be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series, and the like.

FIG. 1 illustrates an embodiment of an electronic device 1 including a scratch prevention system 10. In the embodiment, the electronic device 1 can include a touch panel 11, a pressure sensing device 12, a processing device 13, and a storage device 14. The touch panel 11, the pressure sensing device 12, and the storage device 14 can be coupled to the processing device 13 via a system bus. The storage device 14 can store a plurality of instructions. When the plurality of instructions are executed by the processing device 13, the processing device 13 can receive a press signal of a touch from the pressure sensing device 12 and a touch signal of the touch from the touch panel 11. The processing device 13 compares the press signal with the touch signal to determine whether the press signal includes a first pressure signal detected around a touch area of the touch signal and a second pressure signal corresponding to the touch signal, and can provide a warning signal if the first pressure signal is detected.

The processing device 13 receives the press signal of the touch from the pressure sensing device 12 when the processing device 13 receives the touch signal of the touch from the touch panel 11. The processing device 13 determines size and shape of the touch based on the touch signal, and determines whether the touch is generated by a fingertip based on the size and the shape of the touch. The processing device 13 can compare the touch signal with a plurality of fingertip models stored in the storage device 14 to determine whether the touch is generated by a fingertip.

The processing device 13 determines whether the press signal includes a first pressure signal detected around the touch area of the touch signal when the touch is generated by the fingertip. The press signal can include the first pressure signal and a second pressure signal. The first pressure signal is detected at a first press area surrounding the touch area, and the second pressure signal is detected at a second press area which is similar to the touch area.

The processing device 13 determines whether the first pressure signal is generated by a fingernail when the press signal includes the first pressure signal detected around the touch area. The processing device 13 can compare the first pressure signal with a plurality of fingernail models stored in the storage device 14 or can directly determine based on the size and the shape of the first press area.

The processing device 13 stores the first pressure signal including a pressure intensity characteristic and a pressure period characteristic into the storage device 14. The processing device 13 determines whether the warning signal should be provided based on the first pressure signal. The processing device 13 can provide the warning signal based on at least one of the pressure intensity characteristic and the pressure period characteristic of the first pressure signal.

The touch panel 11 can be a touchpad or a touchscreen, such as a liquid crystal display (LCD) touch screen or an organic light emitting diode (OLED) touch screen, for sensing at least one touch within a touch region of the touch panel 11. The touch panel 11 can be a capacitive touch panel to determine coordinates of the touch by detecting a change of capacitance values on the touch panel 11.

The pressure sensing device 12 can be a pressure sensor. The pressure sensor can be installed under the touch panel 11 so rendering a pressure detecting area of the pressure sensing device 12 the same as a touch detecting area of the touch panel 11. Thus, the pressure sensing device 12 can detect a press signal within the touch region of the touch panel 11.

The processing device 13 can be a central processor (CPU), a graphic processor (GPU), a system on chip (SoC), a field-programmable gate array (FPGA), a processing unit of basic input output system (BIOS), or a controller for executing the program instructions in the storage device 14. The storage device 14 can be a non-volatile computer readable storage medium that can be electrically erased and reprogrammed, it can be static RAM (SRAM), dynamic RAM (DRAM), EPROM, EEPROM, flash memory, or other types of computer memory. The processing device 13 can further include or comprise an embedded system or an application specific integrated circuit (ASIC) having embedded program instructions.

In at least one embodiment, the storage device 14 can include interfaces that can access the aforementioned computer readable storage medium to enable the electronic device 1 to connect to and access such computer readable storage medium. In at least one embodiment, the storage device 14 can be a smart media card, a secure digital card, or a flash card.

In at least one embodiment, the electronic device 1 can be a mobile phone, a tablet, a desktop, a notebook, or other electronic device. FIG. 1 illustrates only one example of an electronic device 1, the electronic device 1 in other embodiments can include more or fewer components than as illustrated, or have a different configuration of the various components.

In at least one embodiment, the scratch prevention system 10 can include one or more modules, for example, a determination module 101, a storage module 102, and a warning module 103. "Module," as used herein, refers to logic embodied in hardware or firmware, or to a collection of software instructions, written in a programming language, such as, JAVA, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable medium include CDs, DVDs, BLU-RAY, flash memory, and hard disk drives.

The determination module 101 receives a touch signal and a press signal of a touch from users, and determines size and shape of the touch based on the touch signal. The determination module 101 determines whether the touch is generated by a fingertip based on the size and the shape, and determines whether an area of the press signal includes a first press area around a touch area of the touch signal and a second press area which is similar to the touch area. The determination module 101 determines whether a first pressure signal corresponding to the first press area is generated by a fingernail. The storage module 102 stores the first pressure signal. The warning module 103 determines whether a warning signal should be provided based on the first pressure signal.

Figure 2:
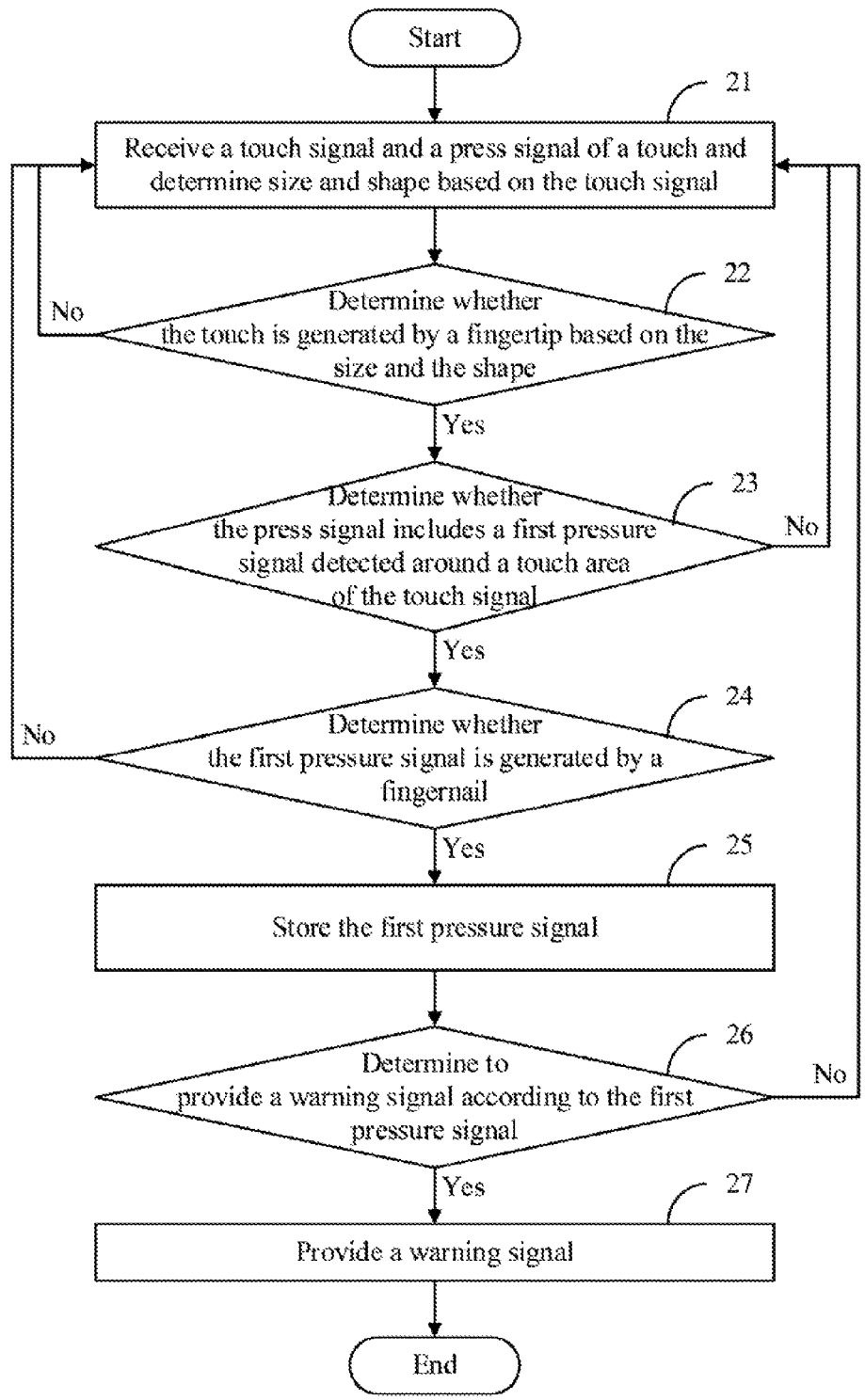
FIG. 2 illustrates a flowchart of one embodiment of a scratch prevention method for the electronic device of FIG. 1.

FIG. 2 illustrates a flowchart in accordance with an example embodiment. The example method is provided by way of example, as there are a variety of ways to carry out the method. The method described below can be carried out using the configuration illustrated in FIG. 1, for example, and various elements of these figures are referenced in explaining example method. Each block shown in FIG. 2 represents one or more processes, methods, or subroutines, carried out in the example method. Furthermore, the order of blocks is illustrative only and can change. Additional blocks can be added or fewer blocks can be utilized without departing from this disclosure. The example method can begin at block 21.

At block 21, the determination module 101 receives a touch signal and a press signal of a touch, and determines size and shape of the touch based on the touch signal.

In at least one embodiment, the determination module 101 determines that a touch has been made when the touch signal is detected by the touch panel 11. The determination module 101 can determine the size and the shape of the object which has made the touch based on the touch signal. For example, the determination module 101 can determine the size and the shape of the touch based on change of capacitance if the touch panel 11 is a capacitive touch panel.

At block 22, the determination module 101 determines whether the touch is generated by a fingertip based on the size and the shape. If the determination module 101 determines that the touch is generated by a fingertip, the procedure goes to block 23. If the determination module 101 determines that the touch is not generated by a fingertip, the procedure goes back to block 21.

In at least one embodiment, the storage device 14 can store a plurality of fingertip models. The determination module 101 can compare the touch signal with the plurality of fingertip models to determine whether the touch is generated by a fingertip. For example, the determination module 101 determines that the touch is generated by the fingertip when the determination module 101 determines that the size and the shape of the touch is similar to those of a specific fingertip model in the plurality of fingertip models. If there is no fingertip model in the plurality of finger models which has size and shape is similar to those of the touch, the determination module 101 determines that the touch is not generated by a fingertip.

In at least one embodiment, the plurality of fingertip models can be pre-stored in the storage device 14. The pre-stored fingertip models can be set as default fingertip models. In at least one embodiment, the plurality of fingertip models can be established by collecting user touches. When the user controls the electronic device 1 by the touch panel 11, the storage device 14 can store size and shape of each touch to increase the number of the fingertip models.

At block 23, the determination module 101 determines whether the press signal includes a first pressure signal detected around a touch area of the touch signal. If the determination module 101 determines that the press signal includes the first pressure signal detected around the touch area, the procedure goes to block 24. If the determination module 101 determines that the press signal does not include the first pressure signal detected around the touch area, the procedure goes back to block 21.

In at least one embodiment, the determination module 101 receives the press signal from the pressure sensing device 12, and determines whether the press signal includes more than one pressure signal. For example, the touch panel 11 controlled by the user can be a capacitive touch panel. The capacitive touch panel 11 can only detect the touch of a fingertip and the pressure sensing device 12 can detect two presses when the fingertip and the fingernail contact the touch panel 11 simultaneously. Thus, the determination module 101 can receive a touch signal generated by the fingertip and two pressure signals where simultaneous and respective pressure signals are generated by the fingernail and the fingertip.

In at least one embodiment, the press signal can include the first pressure signal detected at a first press area and the second pressure signal detected at a second press area. The second press area can be similar to the touch area of the touch signal, and the first press area can be around the touch area.

In at least one embodiment, the determination module 101 determines that the press signal includes the first pressure signal detected around the touch area if a specific pressure signal included in the press signal is detected within a specific area defined by the touch area. The specific area is defined by a specific distance from the touch area. For example, if the shape of the touch area is a circle having a first radius, the shape of the specific area is also a circle having a second radius larger than the first radius. The difference between the first radius and the second radius is the same as the length of the specific distance. In at least one embodiment, the length of the specific distance can be 1 mm.

At block 24, the determination module 101 determines whether the first pressure signal is generated by a fingernail. If the determination module 101 determines that the first pressure signal is so generated, the procedure goes to block 25. If the determination module 101 determines that the first pressure signal is not generated by a fingernail, the procedure goes back to block 21.

In at least one embodiment, the storage device 14 can store a plurality of fingernail models. The determination module 101 can compare the first pressure signal with the plurality of fingernail models to determine whether the first pressure signal is so generated. For example, the determination module 101 can determine that the first pressure signal is generated by the fingernail when the determination module 101 determines that the size and the shape of the first pressure signal is similar to those of a specific fingernail model in the plurality of fingernail models.

In at least one embodiment, the plurality of fingernail models can be pre-stored in the storage device 14. In at least one embodiment, the plurality of fingernail models can be established by collecting user touches made by fingernails. When the pressure sensing device 12 detects the first pressure signal around the touch area of the touch, the storage device 14 can store the size and the shape of the first pressure signal to increase the number of the fingernail models.

In at least one embodiment, the determination module 101 can determine whether the shape of the first press area is an arc surrounding the touch area, to determine whether the first pressure signal is generated by a fingernail. In at least one embodiment, the determination module 101 can also determine whether the concave side of the arc faces toward the touch area, to determine whether the first pressure signal is generated by a fingernail.

At block 25, the storage module 102 stores the first pressure signal. In at least one embodiment, the storage module 102 can store a pressure intensity characteristic and a pressure period characteristic of the first pressure signal in the storage device 14. In at least one embodiment, the storage module 102 can store the size and the shape of the first pressure signal for establishing a fingernail model in the storage device 14.

At block 26, the warning module 103 determines to provide a warning signal based on the first pressure signal or not to provide a warning signal. If the warning module 103 determines that the warning signal should be provided, the procedure goes to block 27. If the warning module 103 determines that there is no need to transmit the warning signal, the procedure goes back to block 21.

In at least one embodiment, the warning module 103 determines to provide or not to provide the warning signal according to at least one of the pressure intensity characteristic and the pressure period characteristic of the first pressure signal. For example, the warning signal can be transmitted when the pressure intensity characteristic is larger than an intensity threshold and a press frequency calculated through the pressure period characteristic is larger than a frequency threshold. The press frequency calculated through the pressure period characteristic can be the number of touches throughout a predefined time period.

At block 27, the warning module 103 provides the warning signal to the user. In at least one embodiment, the warning signal may be a warning message or a warning symbol shown on a display, a warning voice from a speaker, or a warning vibration generated by a motor.

The embodiments shown and described above are only examples. Even though numerous characteristics and advantages of the present technology have been set forth in the foregoing description, together with details of the structure and function of the present disclosure, the disclosure is illustrative only, and changes can be made in the detail, including in matters of shape, size, and arrangement of the parts within the principles of the present disclosure, up to and including the full extent established by the broad general meaning of the terms used in the claims.

What is claimed is:

1. An electronic device, comprising:
a processing device;
a touch panel coupled to the processing device and detecting within a touch region;
a pressure sensing device coupled to the processing device and detecting within the touch region; and
a storage device coupled to the processing device and storing a plurality of instructions with a plurality of fingertip models and a plurality of fingernail models, which when executed by the processing device, cause the processing device to:
receive a press signal of a touch from the pressure sensing device when a touch signal of the touch is received from the touch panel;
compare the press signal to the touch signal to determine whether the press signal includes a first pressure signal detected around a touch area of the touch signal; and
determine to provide a warning signal according to the first pressure signal.

2. The electronic device according to claim 1, further comprising instructions which when executed by the processing device cause the processing device to:
determine to provide the warning signal according to a press frequency of the first pressure signal.

3. The electronic device according to claim 2, wherein the warning signal is provided when the press frequency of the first pressure signal is larger than a frequency threshold.

4. The electronic device according to claim 1, further comprising instructions which when executed by the processing device cause the processing device to:
determine to provide the warning signal according to a pressure intensity characteristic of the first pressure signal.

5. The electronic device according to claim 4, wherein the warning signal is provided when the pressure intensity characteristic of the first pressure signal is larger than a pressure threshold.

6. The electronic device according to claim 1, further comprising instructions which when executed by the processing device cause the processing device to:
determine a size and a shape of the touch area based on the touch signal;
determine whether the touch signal is generated by a fingertip based on the size and the shape of the touch area and the plurality of fingertip models; and
determine whether the press signal includes the first pressure signal detected around the touch area when the touch signal is generated by the fingertip.

7. The electronic device according to claim 6, wherein each of the plurality of fingertip models is established from the size and the shape of the touch area of the touch signal generated by the fingertip and stored into the storage device.

8. The electronic device according to claim 1, further comprising instructions which when executed by the processing device cause the processing device to:
- determine a size and a shape of the first pressure signal; and
- determine whether the first pressure signal is generated by a fingernail based on the size and the shape of the first pressure signal and the plurality of fingernail models.

9. A scratch prevention method for a touch panel of an electronic device, the method comprising:
- receiving a press signal of a touch through a pressure sensing device of the electronic device when a touch signal of the touch is received through the touch panel;
- determining a size and a shape of a touch area based on the touch signal;
- determining whether the touch signal is generated by a fingertip based on the size and the shape of the touch area and a plurality of fingertip models stored in the electronic device;
- determining whether the press signal includes a first pressure signal detected around the touch area of the touch signal when the touch signal is generated by the fingertip; and
- determining to provide a warning signal according to the first pressure signal.

10. The method according to claim 9, comprising:
- determining to provide the warning signal according to a press frequency of the first pressure signal; and
- determining to provide the warning signal according to a pressure intensity characteristic of the first pressure signal.

11. The method according to claim 10, wherein the warning signal is provided when the press frequency of the first pressure signal is larger than a frequency threshold or/and the pressure intensity characteristic of the first pressure signal is larger than a pressure threshold.

12. The method according to claim 9, comprising:
- determining a size and a shape of the first pressure signal; and
- determining whether the first pressure signal is generated by a fingernail based on the size and the shape of the first pressure signal and a plurality of fingernail models stored in the electronic device.

* * * * *